United States Patent [19]

Abel

[11] 4,283,827
[45] Aug. 18, 1981

[54] TOOL FOR REMOVING AXLE SPINDLES

[76] Inventor: Oliver R. Abel, 1831 Broad Ave. NW., Canton, Ohio 44708

[21] Appl. No.: 72,485

[22] Filed: Sep. 4, 1979

[51] Int. Cl.³ .............................................. B23P 19/04
[52] U.S. Cl. ..................................... 29/254; 29/255; 29/263
[58] Field of Search .......... 29/254, 255, 256, 263–266; 81/52, 35, 463

[56] References Cited

U.S. PATENT DOCUMENTS

| | | | |
|---|---|---|---|
| 1,873,294 | 8/1932 | Cosgrove | 29/254 |
| 1,893,414 | 1/1933 | Johnson et al. | |
| 2,310,372 | 2/1943 | Oserowsky | 29/254 |
| 2,377,304 | 6/1945 | Appel | |
| 2,779,089 | 1/1957 | Allen | |
| 3,003,230 | 10/1961 | Fornes | |
| 3,106,012 | 10/1963 | Comer | 29/254 |
| 3,200,484 | 8/1965 | German | 29/263 |
| 3,358,352 | 12/1967 | Wilcox | 29/254 |
| 3,846,898 | 11/1974 | Kerr | 29/259 |

Primary Examiner—James L. Jones, Jr.

Attorney, Agent, or Firm—Frease & Bishop

[57] ABSTRACT

An improved tool construction for removing spindles from axle shafts by use of a slide hammer which exerts an axial pull on the spindle to dislodge it from an axle housing. The tool is a section of cylindrical thick-wall tubing or pipe which forms a housing, one end of which is open and the other end having an end wall attached thereto. A circular opening is formed in the end wall and is concentric to the cylindrical tubing. A pair of bolt-receiving lugs are mounted at diametrically opposite locations on the tubing at the open end thereof. The outer end of a spindle is inserted through the opening formed in the end wall of the housing and the spindle nuts are reinstalled on the spindle and are adapted to abuttingly engage the inside surface of the housing end wall. A plate is attached to one end of the slide hammer and is mounted on the open end of the housing by a pair of bolts engaged in the housing lugs. A weight slidably mounted on a rod of the slide hammer is moved into sharp contact with a stop nut on the other end of the rod to exert an axial force on the spindle to dislodge it from its mounting on the axle housing.

5 Claims, 6 Drawing Figures

U.S. Patent  Aug. 18, 1981  4,283,827
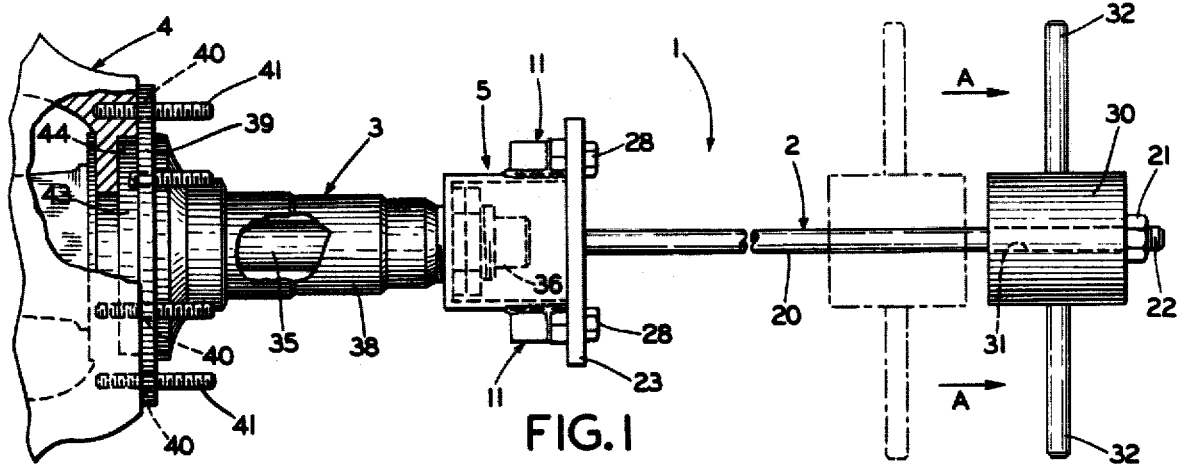
FIG.1
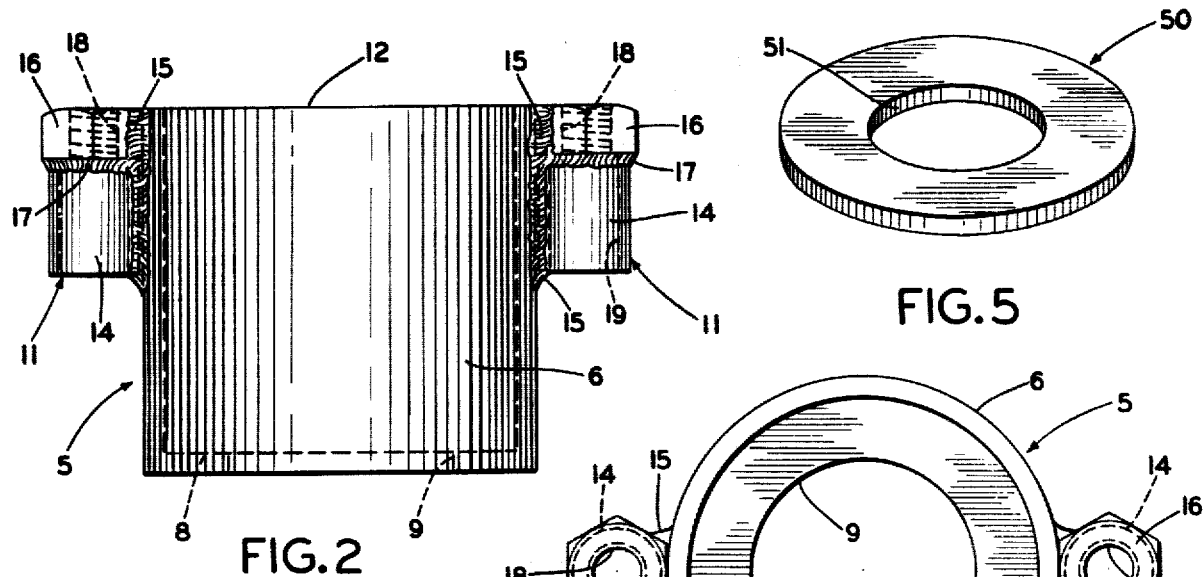
FIG.2
FIG.5
FIG.3
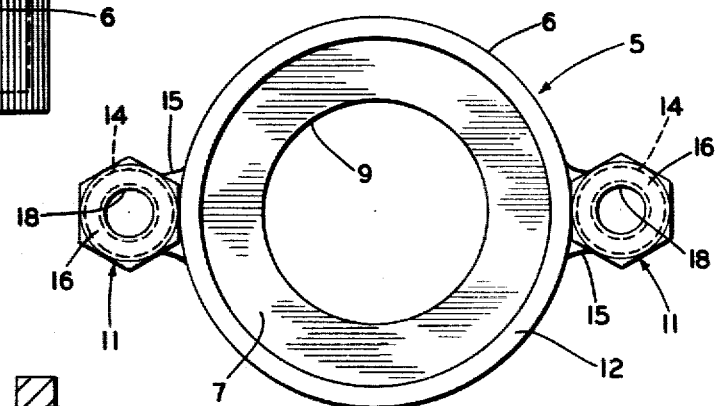
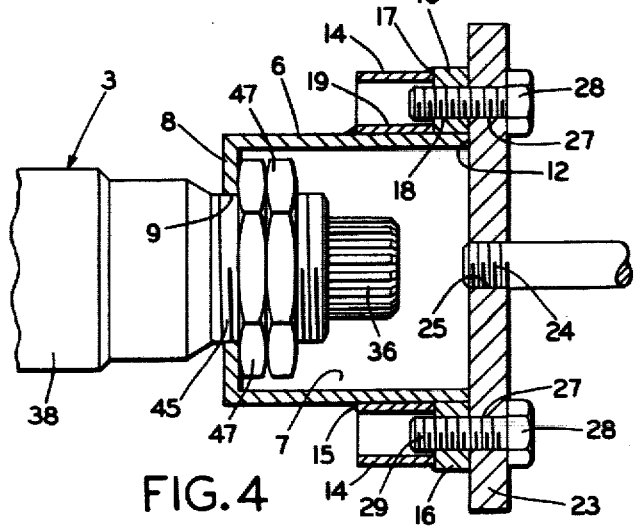
FIG.4
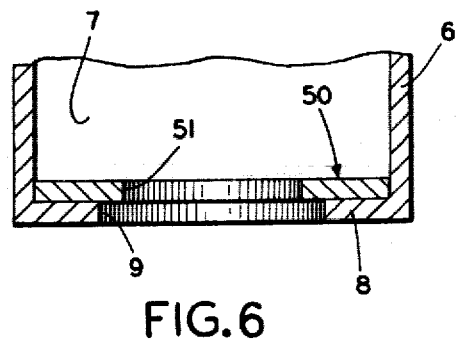
FIG.6

TOOL FOR REMOVING AXLE SPINDLES

BACKGROUND OF THE INVENTION

1. Field of the Invention

The invention relates to tools and particularly to a tool adapted for use in the maintenance of vehicles. More particularly, the invention relates to a relatively simple and inexpensive tool for removing the spindle from the axle housing of a vehicle by means of a slide hammer.

2. Description of the Prior Art

Four-wheel drive vehicles recently have achieved a high degree of popularity, resulting in considerably more maintenance work for four-wheel drive mechanics than heretofore required. One type of maintenance work which is required for four-wheel drive vehicles is the replacement of bearings or the like of the wheel mounting assemblies due to the harsh environments to which such vehicles are subjected.

Such maintenance, in addition to removing the wheel hub, bearings, grease caps, locking pins, and similar components, requires removal of the axle spindle from the axle housing. These spindles consist broadly of a hollow, generally tubular-shaped member through which the axle extends. The spindle has a rear mounting plate arrangement including a main base plate which is bolted to the axle housing and a smaller plate which is telescopically seated within a complementary-shaped circular recess or annular groove formed in the axle housing. The main spindle plate is attached to the axle housing by a plurality of bolts which project outwardly from the housing through complementary-spaced holes formed in this main spindle plate. The telescopic engagement of the smaller spindle plate in the axle housing recess is a relatively snug fit, and over a period of time may become corroded or rusted in the housing mounting due to the accumulation of moisture, dust and dirt.

The present method outlined by some of the vehicle manufacturers for removing the spindle from the axle housing is by striking the spindle in a radial direction with a hammer or mallet to loosen the plate from its mounting recess, enabling the spindle to be pulled axially from the axle housing. This procedure has proved unsatisfactory in that excess striking of the spindle with a hammer may damage the spindle or spindle threads, requiring complete replacement thereof due to the striking force being applied in a radial direction instead of the required axial direction for spindle removal.

Various prior art pulling devices have been developed for removal of certain vehicle components from their mounting during maintenance which require an axial force for their removal. Examples of such pulling devices are shown in U.S. Pat. Nos. 1,873,294, 1,893,414, 2,377,304, 2,779,089, 3,003,230 and 3,106,012. These devices apparently provide a satisfactory result for their intended purpose. However, none of these devices are used for removing spindles from an axle housing. The puller construction of U.S. Pat. No. 1,873,294 is the closest prior art device which possibly could be used for the purpose of applicant's tool. However, this known puller would not provide the same advantages as my puller construction since the angled slotted arrangement of the puller head which fits over the end of the axle would permit twisting and nonaxial alignment of the slide hammer with respect to the axle. Furthemore, the angled, slotted arrangement of the puller head may provide only a two- or three-point contact with the shaft nut depending upon the diameter of the axle.

Accordingly, the need has existed for a simple tool for removing spindles from their axle housing mountings which exerts a true axial pull or force on the spindle. There is no known puller construction of which I am aware which achieves this result by use of a puller having a circular opening formed in an end wall of a housing telescopically mounted on the end of the spindle which will provide a relatively snug fit with the outer diameter of the spindle, so that the force exerted on the spindle will be in a nearly true axial direction.

SUMMARY OF THE INVENTION

Objectives of the invention include providing an improved tool construction for removing spindles from their mounting on the axle housings by an extremely simple, rugged and inexpensive tool, and which enables a true axial pull or force to be exerted on the spindle to dislodge it and break it free from its mounting from within the axle housing; providing such a tool construction having a puller head or housing preferably formed from a section of cylindrical-shaped heavy wall conduit which has a pair of equally, circumferentially spaced mounting lugs provided thereon for attaching to the plate of a slide hammer, and in which the opposite end of the puller housing has an end wall formed with a circular opening for telescopically receiving the end of the spindle therein; providing such a tool construction which may be used for a range of vehicle spindle sizes by removably mounting inexpensive washers within the puller housing to adjust the diameter of the housing end wall opening to match the size of the spindle, thereby maintaining the desired snug fit between the puller housing and spindle to achieve true axial pull thereon; providing such a tool construction in which various types, sizes and arrangements of slide hammers can be used for imparting the axial force on the spindle for removing it from the axle housing; and providing such an improved tool construction which reduces maintenance time and costs, which eliminates difficulties existing in the art, and which satisfies needs and obtains new results in the art.

These objectives and advantages are obtained by the improved tool construction for removing a spindle from an axle housing of a vehicle, the general nature of which may be stated as including a housing having side wall means terminating in an open first end and an opposite axially spaced second end; end wall means mounted on the second end of the side wall means; a circular opening formed in the center of the end wall means adapted to receive an end of a spindle therethrough; a plurality of lug means mounted on the housing side wall means adjacent the open end and spaced equally circumferentially about said open end; and slide hammer means mounted on the housing and attached to the lug means for applying an axial force on said housing to remove the spindle from the axle housing.

BRIEF DESCRIPTION OF THE DRAWING

A preferred embodiment of the invention—illustrative of the best mode in which applicant has contemplated applying the principles —is set forth in the following description and shown in the accompanying drawing, and is particularly and distinctly pointed out and set forth in the appended claims.

FIG. 1 is a diagrammatic elevational view, portions of which are broken away and in section, showing the improved axle spindle tool mounted on an axle spindle prior to removing the same from an axle housing;

FIG. 2 is an enlarged elevational view of the improved spindle removing tool construction with the slide hammer removed;

FIG. 3 is a top plan view of the improved tool construction shown in FIG. 2;

FIG. 4 is an enlarged fragmentary sectional view of a portion of FIG. 1 showing the improved tool of FIGS. 2 and 3 mounted on an axle spindle prior to removing the same from the axle housing;

FIG. 5 is a perspective view of a size adjustment washer adapted to be used with the improved tool construction for different size axle spindles; and FIG. 6 is an enlarged fragmentary sectional view of the lower portion of the improved tool, with the adjustment washer of FIG. 5 removably mounted therein.

Similar numerals refer to similar parts throughout the drawing.

DESCRIPTION OF THE PREFERRED EMBODIMENT

The improved tool construction is indicated generally at 1, and is shown in FIG. 1 mounted on the end of a spindle 3 for removing the same from an axle housing 4. Tool construction 1 includes a housing or puller head 5 (FIG. 2) which is formed by a cylindrical-shaped wall 6 having a hollow interior 7. One end of housing 5 has a disc-shaped end wall 8 which may be formed integrally with side wall 6 or attached thereto as a separate component by welding, brazing, etc. End wall 8 is formed with a circular-shaped central opening 9 concentric with housing wall 6. Housing 5 may be formed from a section of heavy wall conduit or the like, or may be a metal casting or machined from hollow bar stock.

A pair of bolt-receiving lugs, indicated generally at 11, are mounted diametrically opposite of each other on one end of housing wall 6 adjacent an open end 12. Open end 12 is axially opposite of and spaced from end wall 8. Lugs 11 may be formed by short tubular members 14 which are attached to wall 6 by welds 15 with nuts 16 attached to the upper ends thereof by welds 17. Nut 16 is formed with a threaded bore 18 which aligns with the hollow interior 19 of tubular members 14.

A slide hammer 2 is mounted on housing 5 to provide the pulling force for removing spindle 3 from axle housing 4. Slide hammer 2 is of a usual construction consisting of a cylindrical metal rod 20 having a stop nut 21 mounted on an outer threaded end 22. A metal plate 23 is mounted on the opposite end of rod 20 by a threaded end 24 which is engaged within a threaded opening 25 formed in plate 23. Rod 20 could be attached to plate 23 by welding, staking or other attachment means, if desired.

A pair of spaced holes 27 are formed in plate 23 and have a spacing equal to the spacing between bores 18 of lug nuts 16 for attaching plate 23 on housing 5 by engagement with a pair of bolts 28. Threaded ends 29 of bolts 28 are threadably engaged with lug nuts 16, as shown in FIG. 4, to mount plate 23 on open end 12 of housing 5. More than two lugs 11 may be mounted on side housing wall 6, if desired, provided that they are spaced equally circumferentially about open end 12 on wall 6. This enables the pulling force to be applied evenly and in an axial direction on housing 5 and ultimately on spindle 3.

A weight 30 having an axial bore 31 extending therethrough is slidably mounted on rod 20 and movable therealong by a pair of outwardly projecting handles 32. Sliding movement of weight 30 along rod 20 in the direction of arrows A exerts on axial force on plate 23 upon weight 30 striking stop nut 21.

The operation of improved tool construction 1 is shown in FIGS. 1 and 4. The axle assembly for usual four-wheel drive vehicles includes an axle housing 4, the front portion of which is referred to as a "knuckle", in which an axle 35 is rotatably mounted by a plurality of bearing means (not shown). Axle 35 extends outwardly from housing 4 and through the hollow interior of spindle 3, with a spleened outer end 36 of axle 35 extending beyond the end of spindle 3.

Spindle 3 includes a tubular-shaped sleeve 38 having a plurality of stepped zones formed on the outer surface thereof on which are mounted inner and outer bearing cups, grease seals, etc. (not shown). An annular-shaped mounting plate 39 is mounted on one end of sleeve 38 and is formed with a plurality of circumferentially spaced holes 40 through which bolts 41 extend for mounting spindle 3 on axle housing 4. Bolts 41 are attached to and project outwardly from the outer end of axle housing 4.

A smaller diameter mounting plate 43 is formed integrally with the larger mounting plate 39 and is telescopically received within a complementary-shaped annular recess 44 formed in the outer end of axle housing 4. Mounting plate 43 has a relatively snug fit within recess 44 and it is this connection which becomes corroded and rusted which must be broken loose by improved tool construction 1 for removing spindle 3 from axle housing 4.

After the wheel hub and the various bearings, grease cups, etc. are removed from axle 35 and spindle sleeve 38, puller head 5 is telescopically mounted on an outermost stepped zone 45 of sleeve 38 which will be externally threaded. A pair of retaining nuts 47 which had been previously removed from their threaded engagement with outer spindle sleeve zone 45 then are reinstalled, as shown in FIG. 4. Slide hammer 2 then is mounted on open end 12 of puller head 5 by bolts 28. Next, weight 30 is moved rapidly against stop nut 21, whereupon the impact exerted upon rod 20 is transferred through plate 23 and housing wall 6 to retaining nuts 47 due to their abutting engagement with housing wall 8, applying a generally true axial force on spindle 3, breaking loose the "frozen" engagement of mounting plate 43 within annular recess 44.

The diameter of housing end wall opening 9 is complementary to the outer diameter of spindle sleeve zone 45, preventing puller head 5 from tilting appreciably thereon so that the force exerted by weight 30 is transmitted in a generally true axial direction on spindle 3.

In accordance with one of the features of the invention, the striking force of weight 30 is applied equally circumferentially about and on spindle 3. This is due to the circular-like engagement of end wall 8 with retaining nuts 47, and to the equal spacing of housing lugs 11 about the circumference of housing wall 6 for transmitting force equally from plate 23 to nuts 47, instead of the two or three-point contact which can occur in prior puller devices resulting in an unbalanced angled force being exerted on the spindle.

The size of outer zone 45 of spindle 3 may vary depending upon the particular size of the vehicle and manufacturer thereof. Therefore, to provide a proper fit of improved tool construction 1 with respect to the spindle diameter in order to produce a nearly true axial force being exerted thereon, insert adjustment washers, indicated generaly at 50 (FIG. 5), are provided to compensate for these various size spindle diameters.

Washer 50 is formed of a stiff metal annular-shaped member and has an outer diameter complementary to the inside diameter of housing 6 and has a concentric central opening 51. Opening 51 has a diameter complementary to the outside diameter of outer spindle zone 45. Washer 50 is simply placed within housing 6 and lies in abutment with the inside surface of housing 6 and wall 8 (FIG. 6), with washer opening 51 telescopically receiving the outer stepped end of a spindle (not shown) therethrough in a similar manner as the arrangement shown in FIGS. 1 and 4.

This matching of the end wall opening, now provided by washer opening 51, with the outer diameter of the axle spindle properly mounts tool construction 1 on the spindle, reducing or nearly eliminating any wobble therebetween, so that the pulling force exerted on puller head 5 by slide hammer 2 is applied in an axial direction. Spindle nuts are installed on the threaded end of these various size spindles and abut the inside surface of washer 50 in the same manner as shown in FIGS. 1 and 4. The outer diameter of washer 50 will remain constant for a particular size housing 6, and a series of such washers may be provided having different size diameters of central openings 51 formed therein to enable tool 1 to be adaptable for use with nearly all makes, sizes and types of vehicles having spindles of the general type shown in the drawings and described above to facilitate their removal from the axle housing. Washer 50 requires no attachment means of any type and is merely dropped within cylindrical wall 6 of housing or puller head 5 through its open end 12 after the correct washer size has been selected.

Improved tool construction 1 has a number of advantages over known axle or spindle-type pulling tools. Tool 1 is formed of an extremely simple, inexpensive and rugged construction consisting of a short section of heavy wall pipe or conduit having an end wall formed integrally therewith or attracted by welding, with a pair of bolt-receiving lugs welded on the open end thereof. This construction can be used with various slide hammers and requires only that the attachment plate of the slide hammer have holes formed therein to align with the spacing between the bolt-receiving lugs of housing 5. Operation of improved tool construction 1 requires only the placement of spindle nuts 47 on the end of the spindle after mounting or housing 6 thereon, followed by the attachment of slide hammer plate 23 on the outer end of housing 6 by a pair of bolts 28. Several sharp knocks of weight 30 against stop nut 21 should be sufficient for most maintenance jobs to break spindle 3 loose from its mounting on axle housing 4. Washer 50 also enables improved tool construction 1 to be adaptable for use with different size spindles of various vehicle manufacturers increasing its versatility and usefulness.

One of the most important features of improved tool construction 1 is the distribution of the force generated by slide hammer 2 equally circumferentially on housing 5 and correspondingly on housing wall 8 and nuts 47, and in an axial direction with respect to the axis of spindle 3. This prevents the formation of a radial force vector acting upon the engagement of spindle mounting plate 43 in annular recess 44 retarding the disengagement therebetween.

Accordingly, the improved tool construction is simplified, provides an effective, safe, inexpensive and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the tool for removing axle spindles is constructed and used, the characteristics of the construction, and the advantageous, new and useful results obtained; the new and useful structures, devices, elements, arrangements, parts, and combinations, are set forth in the appended claims.

I claim:

1. An improved tool construction for removing a spindle from an axle housing including:
    (a) a housing having side wall means terminating in an open first end and an opposite axially spaced second end;
    (b) end wall means mounted on the second end of the side wall means;
    (c) a circular opening formed in the center of the end wall means adapted to receive an end of a spindle therethrough;
    (d) a plurality of lug means provided on the housing side wall means adjacent the open first end and spaced equally circumferentially about said open end;
    (e) slide hammer means mounted on the housing and attached to the lug means for applying an axial force on said housing to remove the spindle from the axle housing, said slide hammer means including a rod, a weight slidably mounted on the rod, a stop mounted on one end of the rod, and an attachment plate mounted on the other end of the rod;
    (f) openings formed in the attachment plate and having a spacing complementary to the spacing of the spaced lug means; and
    (g) a pair of bolts extending through the plate openings and threadedly engaged with the lug means to mount the slide hammer means on the housing.

2. The construction defined in claim 1 in which the side wall means is a section of cylindrical-shaped thick wall metal conduit; and in which the end wall is an annular-shaped member.

3. The construction defined in claim 2 in which an annular-shaped washer is telescopically removably mounted within the cylindrical-shaped housing in juxtaposition with the end wall to reduce the size of the spindle-receiving opening.

4. The construction defined in claim 1 in which the lug means is a pair of diametrically spaced lugs formed with internally threaded bores.

5. An improved tool construction for removing a spindle from an axle housing including:

(a) a housing having continuous, closed side wall means terminating in an open first end and an opposite axially spaced second end;

(b) end wall means mounted on the second end of the side wall means;

(c) a circular opening formed in the center of the end wall means adapted to receive an end of a spindle therethrough;

(d) abutment means adapted to be inserted through the open first end of the housing and mounted on the spindle end within the housing and engageable with the housing end wall means;

(e) first attachment means provided on the housing side wall means;

(f) slide hammer means including a rod, a weight slidably mounted on the rod, and a stop mounted on one end of the rod; and (g) second attachment means mounted on the other end of the rod opposite of the stop and releasably engageable with the first attachment means on the housing side wall means to operatively mount the slide hammer means on the housing adjacent the open first end for applying an axial force on said housing and on the spindle through engagement of the housing end wall means with the abutment means to remove a spindle from an axle housing.

* * * * *